United States Patent
Chacon et al.

(10) Patent No.: US 9,719,495 B2
(45) Date of Patent: Aug. 1, 2017

(54) LIGHTNING PROTECTION SYSTEM FOR WIND TURBINE ROTOR BLADES

(71) Applicant: General Electric Company, Schenectady, NY (US)

(72) Inventors: Joseph Lawrence Chacon, Greenville, SC (US); Richard Allen Hardison, Greenville, SC (US)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 14/710,632

(22) Filed: May 13, 2015

(65) Prior Publication Data

US 2016/0333861 A1 Nov. 17, 2016

(51) Int. Cl.
| | | |
|---|---|---|
| F03D 11/00 | (2006.01) | |
| F03D 1/06 | (2006.01) | |
| F03D 11/04 | (2006.01) | |
| F03D 80/30 | (2016.01) | |

(52) U.S. Cl.
CPC ........ F03D 11/0033 (2013.01); F03D 1/0675 (2013.01); F03D 11/04 (2013.01); F03D 80/30 (2016.05); Y02E 10/721 (2013.01)

(58) Field of Classification Search
CPC .............................. F03D 80/30; F03D 1/0675
See application file for complete search history.

(56) References Cited

U.S. PATENT DOCUMENTS

| | | |
|---|---|---|
| 6,457,943 B1 | 10/2002 | Olsen et al. |
| 7,040,864 B2 | 5/2006 | Johansen et al. |
| 7,390,169 B2 | 6/2008 | Larsen et al. |
| 7,468,505 B2 | 12/2008 | Kraemer |
| 7,508,186 B2 | 3/2009 | Mortenson |
| 7,729,100 B2 | 6/2010 | Llorente Gonzalez et al. |
| 8,096,765 B2 | 1/2012 | Fritz et al. |

(Continued)

FOREIGN PATENT DOCUMENTS

| | | |
|---|---|---|
| CN | 201810500 U | 4/2011 |
| DE | 102011014537 B3 | 5/2012 |

(Continued)

OTHER PUBLICATIONS

European Search Report and Opinion issued in connection with corresponding European Application No. 16168474.1 on Sep. 29, 2016.

(Continued)

*Primary Examiner* — Craig Kim
*Assistant Examiner* — Eldon Brockman
(74) *Attorney, Agent, or Firm* — Dority & Manning, P.A.

(57) ABSTRACT

The present disclosure is directed to a lightning protection system for a wind turbine rotor blade. The lightning protection system includes a lightning conductive circuit having at least one electrical conductor and at least one semiconductor. The semiconductor is configured for placement at a blade root of the rotor blade. Further, the electrical conductor is configured to electrically couple a blade tip of the rotor blade to a ground conductor. In addition, the electrical conductor is configured to electrically couple the semiconductor between one or more spar caps located on either or both of the pressure or suction sides at the blade root and the ground conductor.

20 Claims, 4 Drawing Sheets

(56) References Cited

U.S. PATENT DOCUMENTS

| | | |
|---|---|---|
| 8,137,074 B2 | 3/2012 | Mendez Hernandez et al. |
| 8,258,773 B2 | 9/2012 | Brnada |
| 8,622,710 B2 | 1/2014 | Rindt et al. |
| 8,777,579 B2 | 7/2014 | Hancock et al. |
| 2006/0280613 A1 | 12/2006 | Hansen |
| 2007/0041834 A1 | 2/2007 | Schram et al. |
| 2007/0108770 A1* | 5/2007 | Riesberg ............ F03G 7/08 290/44 |
| 2008/0073098 A1* | 3/2008 | Llorente Gonzalez B82Y 30/00 174/2 |
| 2009/0129927 A1 | 5/2009 | Grabau |
| 2009/0196751 A1 | 8/2009 | Jacobsen et al. |
| 2011/0142671 A1* | 6/2011 | Fritz ............... F03D 80/30 416/230 |
| 2012/0025804 A1* | 2/2012 | Brnada ............ G01R 15/18 324/72 |
| 2012/0133146 A1* | 5/2012 | Naka ............... F03D 80/30 290/55 |
| 2012/0282097 A1* | 11/2012 | Lewke ............. F03D 80/00 416/146 R |
| 2013/0100570 A1* | 4/2013 | Lyngby ............ F03D 80/30 361/117 |
| 2016/0131110 A1* | 5/2016 | Livingston ........ F03D 11/0033 416/146 R |

FOREIGN PATENT DOCUMENTS

| | | |
|---|---|---|
| EP | 2336560 A1 | 6/2011 |
| WO | 0079128 A1 | 12/2000 |

OTHER PUBLICATIONS

Publication—"Lightning Strike Sensor for Wind Turbines", Jan. 2001, DEFU Report 454.

U.S. Appl. No. 14/537,952, filed Nov. 11, 2014.

* cited by examiner

LIGHTNING PROTECTION SYSTEM FOR WIND TURBINE ROTOR BLADES

FIELD OF THE INVENTION

The present subject matter relates generally to wind turbines, and more particularly to wind turbine rotor blades having a lightning protection system configured therewith.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Large commercial wind turbines are prone to lightning strikes that can damage the rotor blades, particularly at the blade root. In this regard, it is a common practice to provide the turbine blades with lightning receptors spaced along the longitudinal length of the blade so as to capture and conduct the lightning strikes to ground. The conventional configuration of these receptors, however, results in difficult, expensive, and time-consuming maintenance and diagnostic procedures that typically requires a crane to externally access each receptor. The conventional configuration does not offer a means to verify the continuity of the receptors within a blade without accessing and testing each receptor individually. In addition, the effectiveness of the receptors depends on the integrity and reliability of a single conductive path along the blade. Failure (i.e., a break) of this path renders any upstream receptors essentially useless.

Efforts have been made to devise alternative lightning protection systems for wind turbine blades. For example, U.S. Patent Publication No. 2009/0129927 describes a system that avoids blade mounted receptors altogether by mounting radially extending lightning receptors to the rotor hub, with the receptors extending between the blades. This configuration, however, may result in increased weight, drag, and noise, and an overall decrease in the capability of the turbine.

Accordingly, the industry would benefit from an improved lightning protection system that addresses the aforementioned issues. Particularly, a lightning protection system for a wind turbine that prevents damage to the blade root would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a wind turbine rotor blade. The rotor blade includes a blade root, a blade tip, and a pressure side and a suction side extending between the blade tip and the blade root. Further, the pressure and suction sides define an internal cavity. The rotor blade also includes a lightning conductive circuit having at least one electrical conductor and at least one semiconductor located within the internal cavity at the blade root. Further, the electrical conductor electrically couples the blade tip to a ground conductor. In addition, the electrical conductor electrically couples the semiconductor between one or more spar caps located on either or both of the pressure or suction sides and the ground conductor.

In one embodiment, the semiconductor may include any one of or a combination of the following: a varistor, a spark gap, a diode, or similar. More specifically, in certain embodiments, the varistor may be a metal oxide varistor (MOV). In addition, in particularly embodiments, the electrical conductor may include a cable wire.

In further embodiments, the electrical conductor may include a plurality of conductive members electrically coupling the one or more spar caps located on either or both of the pressure or suction sides to the ground conductor. In particular embodiments, the conductive members may also be cable wires branching off from the electrical conductor. Thus, in certain embodiments, the conductive members are configured to electrically couple the blade tip to a pressure side spar cap and a suction side spar cap and to the ground conductor.

In a specific embodiment, for example, the lightning conductive circuit includes at least two semiconductors, wherein one of the semiconductors is electrically coupled to the pressure side spar cap and the ground conductor via one or more of the conductive members, and wherein another one of the semiconductor is electrically coupled to the suction side spar cap and the ground conductor via one or more of the conductive members.

In additional embodiments, the electrical conductor may be electrically coupled to the either or both of the pressure or suction side spar caps of the rotor blade via one or more electrical connections. More specifically, the electrical connections may include one or more fasteners configured partially through either or both of the pressure or suction side spar caps of the rotor blade. Alternatively, the electrical connections may include one or more through-bolts configured completely through either or both of the pressure or suction side spar caps of the rotor blade. In further embodiments, the electrical conductor may also include at least one terminal end that extends through the blade root to the ground conductor.

In another aspect, the present disclosure is directed to a lightning protection system for a wind turbine rotor blade. The lightning protection system includes a lightning conductive circuit having at least one electrical conductor and at least one semiconductor. The semiconductor is configured for placement at or near a blade root of the rotor blade. Further, the electrical conductor is configured to electrically couple a blade tip of the rotor blade to a ground conductor. In addition, the electrical conductor is configured to electrically couple the semiconductor between one or more spar caps located on either or both of the pressure or suction sides at the blade root and the ground conductor. It should be understood that the lightning protection system may be further configured with any of the additional features as described herein.

In yet another aspect, the present disclosure is directed to a wind turbine. The wind turbine includes a tower, a nacelle mounted atop the tower, and a rotor hub having a plurality of rotor blades mounted thereto. Each of the rotor blades includes a blade root, a blade tip, and a pressure side and a suction side extending between the blade tip and the blade root. Further, the pressure and suction sides define an internal cavity. In addition, at least one of the rotor blades further includes a lightning conductive circuit having at least one electrical conductor and at least one semiconductor located within the internal cavity of the rotor blade at the blade root. Further, the electrical conductor electrically couples the blade tip to a ground conductor. In addition, the electrical conductor electrically couples the semiconductor between one or more spar caps located on either or both of the pressure or suction sides and the ground conductor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
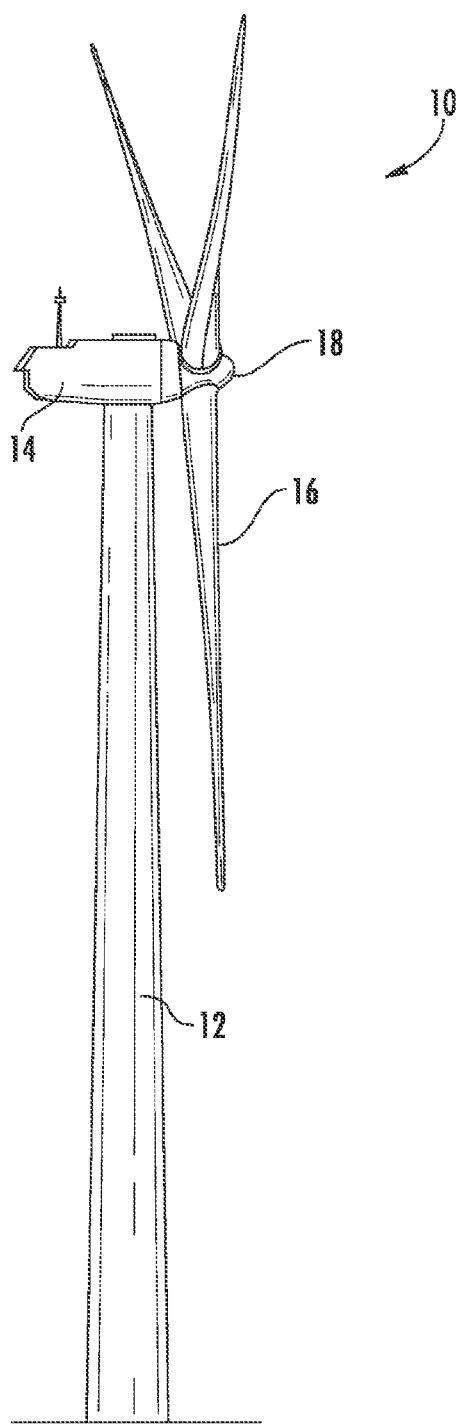
FIG. 1 illustrates a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a lightning protection system for a wind turbine rotor blade. The lightning protection system includes a lightning conductive circuit having at least one electrical conductor electrically coupled with at least one semiconductor. Further, the semiconductor is located within an internal cavity of the rotor blade at the blade root. The electrical conductor is configured to electrically couple the blade tip of the rotor blade to a ground conductor. Further, the electrical conductor is configured to electrically couple the semiconductor between one or more spar caps located on either or both of the pressure or suction sides and the ground conductor.

Thus, the present disclosure provides many advantages not present in the prior art. For example, the lightning protection system of the present disclosure can be can be retrofitted to the wind turbine without lowering the blade. Further, the present disclosure is relatively inexpensive and easier to install in comparison to other retrofit solutions. Moreover, damaging transient over-voltage conditions and currents through the spar caps can be minimized and/or eliminated. In addition, through-bolt connections through the spar caps, which can weaken the structural integrity of the spar caps, is not required. Thus, the equipotential connections made between the carbon spar caps and the down conductor can be reduced. Even further, if the blade tip connection is lost and arcing current occurs (thereby damaging the blade), the blade tip is easier to repair than the entire rotor blade.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes rotor blades 16 coupled to and extending radially outward from the hub 18. As shown, the rotor hub 18 includes three rotor blades 16. However, in an alternative embodiment, the rotor hub 18 may include more or less than three rotor blades 16.

The rotor blades 16 may generally have any suitable length that enables the wind turbine 10 to function according to design criteria. For example, the rotor blades 16 may have a length ranging from about 15 meters (m) to about 90 m. However, other non-limiting examples of blade lengths may include less than 15 m, from about 20 m, from about 30 m, or a length that is greater than 90 m. Thus, the rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
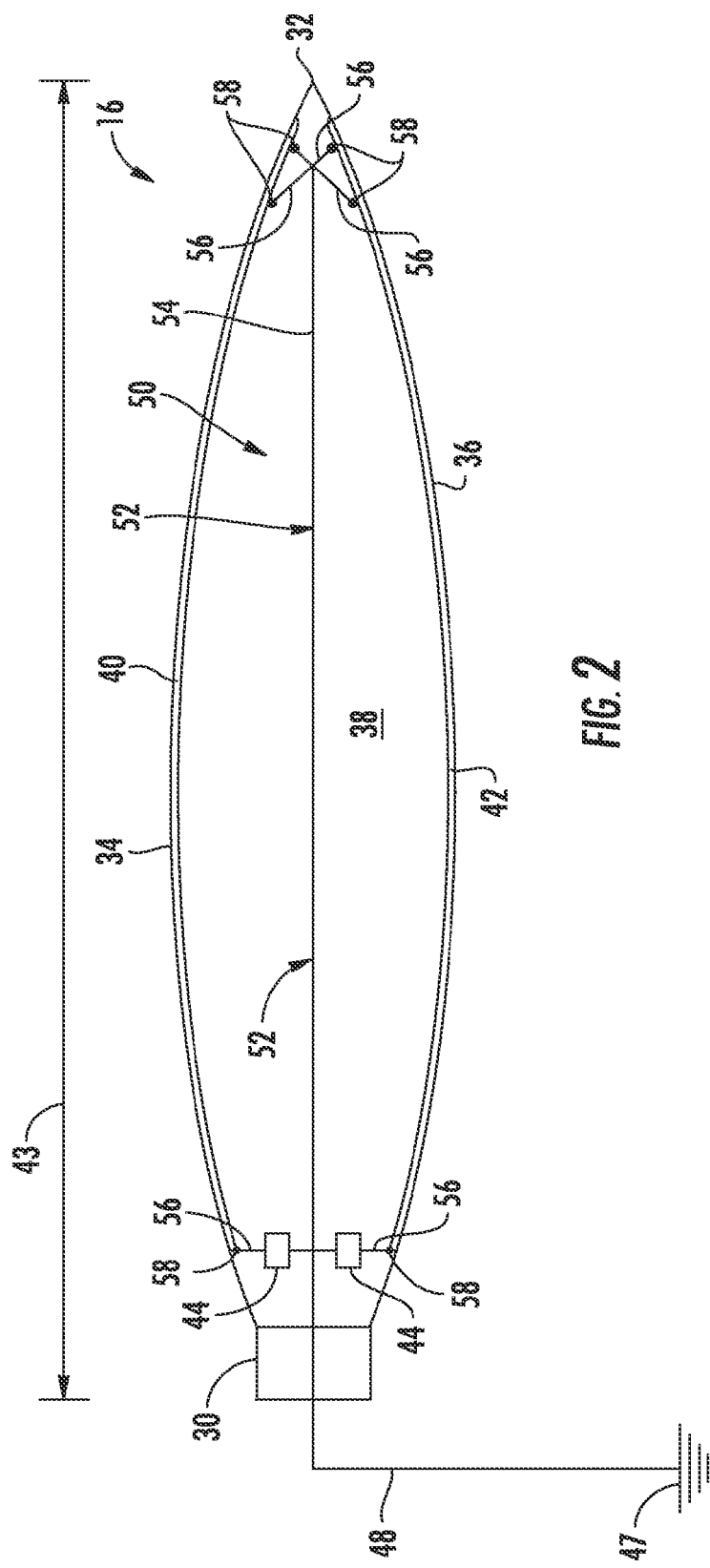
FIG. 2 illustrates a cross-sectional view of one embodiment of a rotor blade having a lightning protection system installed within an internal cavity of the blade according to the present disclosure.

Referring now to FIG. 2, a cross-sectional view of one embodiment of a wind turbine rotor blade 16 having a lightning protection system 50 configured therein is provided. As shown, the rotor blade 16 includes a blade root 30, a blade tip 32, a pressure side 34, and a suction side 36. The pressure side 34 and suction side 36 extend between the blade root 30 and the blade tip 32 and define an internal cavity 38 for the blade 16. The rotor blade 16 may also include one or more longitudinally extending structural components configured to provide increased stiffness, buckling resistance and/or strength to the rotor blade 16. For example, the rotor blade 16 may include a pair of longitudinally extending spar caps 40, 42 configured to be engaged against the opposing inner surfaces of the pressure and suction sides 34, 36 of the rotor blade 16, respectively. Additionally, one or more shear webs (not shown) may be disposed between the spar caps 40, 42 so as to form a beam-like configuration. The spar caps 40, 42 may generally be designed to control the bending stresses and/or other loads acting on the rotor blade 16 in a generally span-wise direction (a direction parallel to the span 43 of the rotor blade 16) during operation of a wind turbine 10.

In several embodiments of the present subject matter, the spar caps 40, 42 may be formed from any suitable laminate composite material, including but not limited to laminate composites reinforced with carbon, mixtures of carbon, fiberglass, mixtures of fiberglass, mixtures of carbon and fiberglass and any other suitable reinforcement material and mixtures thereof.

Figure 3:
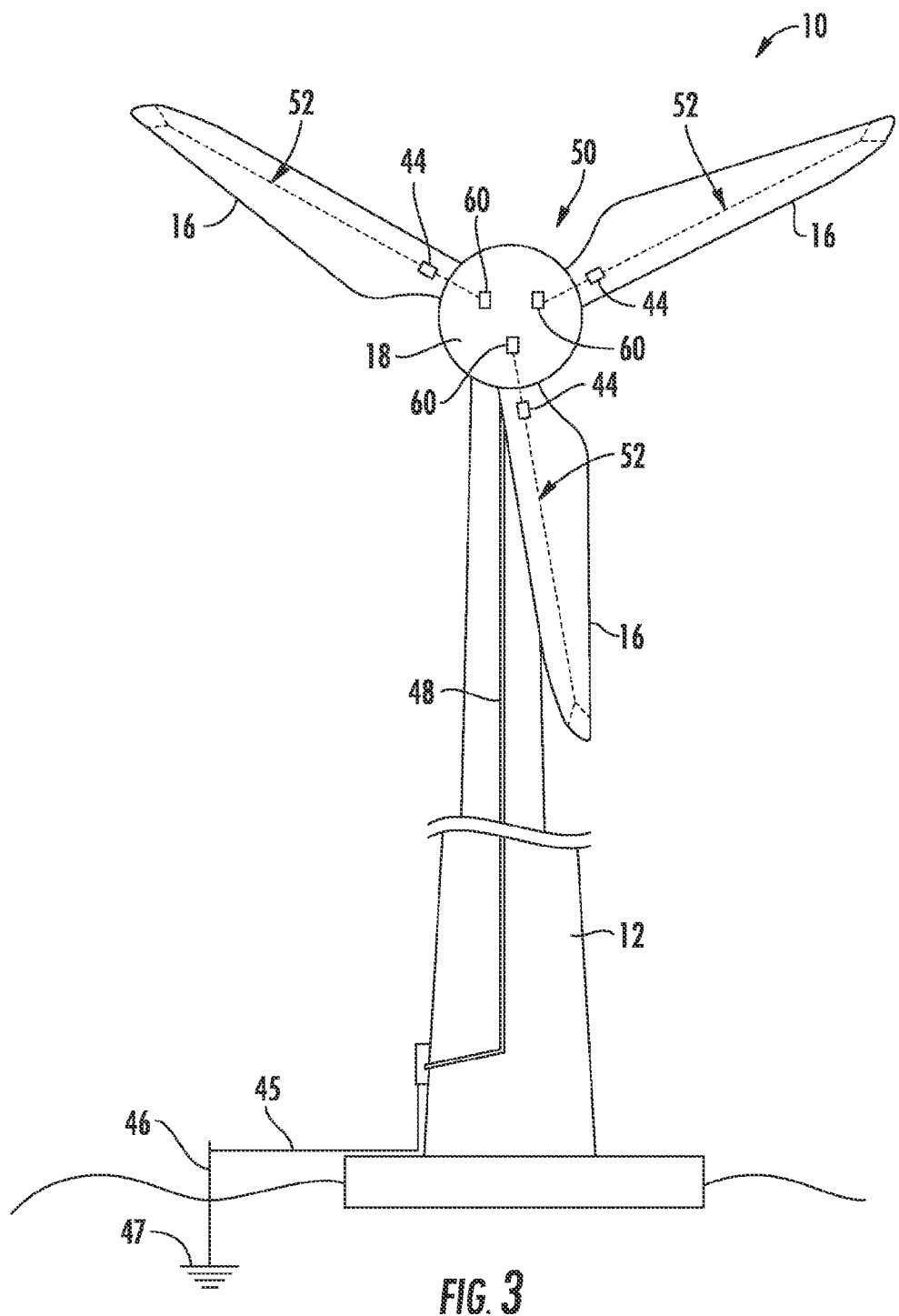
FIG. 3 illustrates a front view of one embodiment of a wind turbine having a lightning protection system installed thereon according to the present disclosure.

Referring generally to FIGS. 2 and 3, the lightning protection system 50 of the wind turbine 10 may include a lightning conductive circuit 52 configured with one or more of the rotor blades 16. For example, as shown, the lightning protection system 50 includes three lightning protection circuits 52, or one circuit per rotor blade 22. In additional embodiments, the lightning protection system 50 may include more than three or less than three circuits 52. More specifically, the number of circuits 52 in the lightning protection system 50 may correspond to the number of rotor blades 22 of the turbine 10. It should also be understood that any portion of the lightning protection system 50 may include existing blade structures within the circuit 52, such as the carbon spar caps, trailing serrations, leading edge protectors, fairings, and so forth.

As shown, each lightning conductive circuit 52 includes at least one electrical conductor 54 configured with at least one semiconductor 44. Further, the semiconductor(s) 44 is located within the internal cavity 38 at or near the blade root 30 of the rotor blade 16. Thus, the electrical conductor 54 is configured to electrically couple the blade tip 32 of the rotor blade 16 to ground, e.g. via a ground conductor 47. More specifically, the electrical conductor 54 may include a cable wire having one or more conductive members or wires 56 extending therefrom so as to electrically couple the pressure and suction spar caps 40, 42 near the blade tip 32 to the ground conductor 47. For example, as shown in FIG. 2, the electrical conductor 54 includes four conductive members 56 extending from a distal end of the electrical conductor 54 such that the conductor 54 contacts each of the spar caps 40, 42 at two connection points 58, which will be described in more detail below. In further embodiments, the electrical conductor 54 may include more than four or less than four conductive members 56.

Referring particularly to FIG. 2, the electrical conductor 54 extends from the blade tip 32 to the blade root 30 and electrically couples one or more semiconductors 44 between the pressure and suction side spar caps 40, 42 and the ground conductor 47. More specifically, as shown, the lightning conductive circuit 52 may include at least two semiconductors 44 at or near the blade root 30. Thus, a first semiconductor 44 may be electrically coupled to the pressure side spar cap 40 and the ground conductor 47 via one or more of the conductive members 56 and a second semiconductor 44 may be electrically coupled to the suction side spar cap 42 and the ground conductor 47 via one or more of the conductive members 56. In addition, as shown, the conductive members 56 are configured to electrically couple the semiconductor(s) 44 to either or both of the pressure or suction side spar caps 40, 42 at one or more connection points 58. Accordingly, the semiconductors 44 are intentionally located electrically at the blade root 30 between the spar caps 40, 42 and the ground conductor 47 to provide adequate lightning protection for the wind turbine 10.

Figure 4:
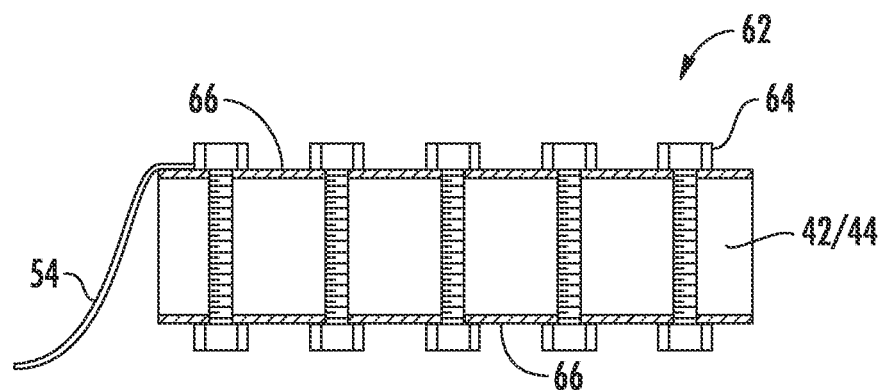
FIG. 4 illustrates a cross-sectional view of one embodiment of a spar cap of a wind turbine rotor blade, particularly illustrating a plurality of through-bolt electrical connections of a lightning protection system configured through the spar cap according to conventional construction.
Figure 5:
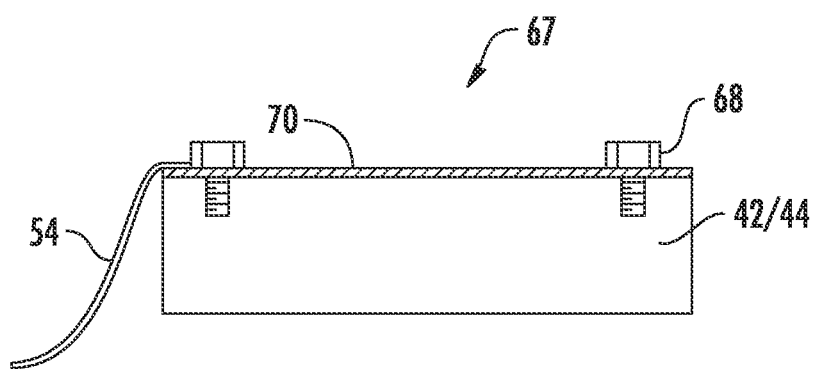
FIG. 5 illustrates a cross-sectional view of one embodiment of a spar cap of a wind turbine rotor blade, particularly illustrating an electrical connection of a lightning protection system to the spar cap according to the present disclosure.

Referring now to FIGS. 4 and 5, the electrical conductor 54 may be electrically coupled to the either or both of the pressure or suction sides 34, 36 of the rotor blade 16 via one or more electrical connections 62, 67 at the connection points 58. For example, as shown in FIG. 4, the electrical connections 62 may include conventional connections having one or more through-bolts 64 configured completely through either or both of the pressure or suction side spar caps 40, 42 of the rotor blade 22. More specifically, as shown, the electrical connections 62 may also include one or more conductive plates 66 configured on one or more sides of the spar caps 40, 42 with the through-bolts 64 extending therethrough to provide a solid electrical connection. As mentioned, however, such connections 62 may be time-consuming and expensive to install and may compromise the structural integrity of the rotor blade 22. As such, in an alternative embodiment, as shown in FIG. 5, the electrical connections 67 may include one or more fasteners 68 configured partially through either or both of the pressure or suction side spar caps 40, 42 of the rotor blade 22. Such electrical connections 67 may also include at least one conductive plate 70 similar to the plates 66 of FIG. 4. As shown in FIG. 5, however, the electrical connection 67 only requires one plate 70 as the fasteners 68 do not extend all the way through the spar caps 40, 42. Though the connections 67 of FIG. 5 may be weaker than the connections 62 of FIG. 4, such connections 67 still provide sufficient management of the current and voltage within the rotor blade 22 caused by lightning strikes due to the configuration of the lightning conductive circuit 52.

Referring particularly to FIG. 3, each of the electrical conductors 54 of each lightning conductive circuit 52 may also include at least one terminal end 60 that extends through the blade root 30 of each rotor blade 16 and are individually connected to a grounding system within the rotor hub 18. More specifically, the lightning conductive circuit 50 may have a gauge suitable for defining a conductive leg for transmitting a lightning strike occurring on the blade 16 to ground via connection of the terminal end 60 to the wind turbine's ground system. The ground system may be variously configured, as is well known in the art. For example, the ground system may include any conductive path defined by the wind turbine's machinery or support structure, including blade bearings, machinery bed plates, tower structure, and the like, that defines any suitable ground conductive path 48 from the blades 16, through the tower 12, to a ground rod 46 via a ground cable 45, or other suitable electrical ground path, to the ground 47.

The semiconductor(s) 44 as described herein may be any suitable semiconductor now known or later developed in the art that provides adequate management of both current and voltage within the rotor blade 22 caused by a lightning strike. For example, the semiconductor(s) of the present disclosure may have a tight voltage-current curve such that as voltage increases, current remains saturated (i.e. current is mitigated). Thus, the semiconductor(s) 44 of the present disclosure prevent arcing caused by lightning strikes. More specifically, in certain embodiments, the semiconductor(s) 44 as described herein may include at least one of a varistor, a spark gap, a diode, or similar. More specifically, in certain embodiments, the semiconductor(s) 44 may include a metal oxide varistor (MOV). As used herein, a MOV generally refers to a varistor with and electrical resistivity that varies with the applied voltage. Further, a typically MOV includes a ceramic mass of zinc oxide grains configured in a matrix of other metal oxides and sandwiched between two metal plates (i.e. electrodes). The boundary between each grain and its neighbor forms a diode junction, which allows current to flow in only one direction. Thus, a typical MOV has a high resistance at low voltages and a low resistance at high voltages.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
a blade root, a blade tip, and a pressure side and a suction side extending between the blade tip and the blade root, the pressure and suction sides defining an internal cavity; and,
a lightning conductive circuit comprising at least one electrical conductor and at least one semiconductor located within the internal cavity at the blade root,
wherein the electrical conductor electrically couples the blade tip to a ground conductor, and wherein the electrical conductor electrically couples the semiconductor between one or more spar caps located on either or both of the pressure or suction sides and the ground conductor.

2. The wind turbine blade of claim 1, wherein the at least one semiconductor comprises at least one of a varistor, a spark gap, or a diode.

3. The wind turbine blade of claim 2, wherein the varistor comprises a metal oxide varistor (MOV).

4. The wind turbine blade of claim 1, wherein the at least one electrical conductor comprises a cable wire.

5. The wind turbine blade of claim 4, wherein the electrical conductor further comprises a plurality of conductive members electrically coupling the one or more spar caps located on either or both of the pressure or suction sides to the ground conductor.

6. The wind turbine blade of claim 5, wherein the plurality of conductive members comprises cable wires extending from the electrical conductor.

7. The wind turbine blade of claim 5, wherein the plurality of conductive members electrically couple the blade tip to a pressure side spar cap and a suction side spar cap and to the ground conductor.

8. The wind turbine blade of claim 7, wherein the lightning conductive circuit further comprises at least two semiconductors, wherein one of the semiconductors is electrically coupled to the pressure side spar cap and the ground conductor via one or more of the conductive members, and wherein another one of the semiconductors is electrically coupled to the suction side spar cap and the ground conductor via one or more of the conductive members.

9. The wind turbine blade of claim 1, wherein the electrical conductor is electrically coupled to the either or both of the pressure or suction side spar caps of the rotor blade via one or more electrical connections, wherein the electrical connections comprise one or more fasteners configured partially through either or both of the pressure or suction side spar caps of the rotor blade.

10. The wind turbine blade of claim 1, wherein the electrical conductor further comprises at least one terminal end that extends through the blade root to the ground conductor.

11. A lightning protection system for a wind turbine rotor blade, the lightning protection system comprising:
a lightning conductive circuit comprising at least one electrical conductor and at least one semiconductor, the semiconductor configured for placement at a blade root of the rotor blade,
wherein the electrical conductor is configured to electrically couple a blade tip of the rotor blade to a ground conductor, and wherein the electrical conductor is configured to electrically couple the semiconductor between one or more spar caps located on either or both of the pressure or suction sides at the blade root and the ground conductor.

12. The lightning protection system of claim 11, wherein the at least one semiconductor comprises at least one of a varistor, a spark gap, or a diode.

13. The lightning protection system of claim 12, wherein the varistor comprises a metal oxide varistor (MOV).

14. The lightning protection system of claim 11, wherein the at least one electrical conductor comprises a cable wire.

15. The lightning protection system of claim 11, wherein the electrical conductor further comprises a plurality of conductive members configured to electrically couple the one or more spar caps located on either or both of the pressure or suction sides to the ground conductor.

16. The lightning protection system of claim 15, wherein the plurality of conductive members comprises cable wires extending from the electrical conductor.

17. The lightning protection system of claim 15, wherein the plurality of conductive members are configured to electrically couple the blade tip to a pressure side spar cap and a suction side spar cap and to the ground conductor.

18. The lightning protection system of claim 17, wherein the lightning conductive circuit further comprises at least two semiconductors, wherein at least one of the plurality of conductive members is configured to electrically couple one of the semiconductors to the pressure side spar cap and the ground conductor, and wherein at least another one of the conductive members is configured to electrically couple another one of the semiconductors to the suction side spar cap and the ground conductor.

19. The lightning protection system of claim 11, wherein the electrical conductor further comprises at least one terminal end that extends through the blade root to the ground conductor.

20. A wind turbine, comprising:
a tower;
a nacelle mounted atop the tower;
a rotor hub comprising a plurality of rotor blades mounted thereto, each of the rotor blades comprising a blade root, a blade tip, and a pressure side and a suction side extending between the blade tip and the blade root, the pressure and suction sides defining an internal cavity;
at least one of the rotor blades further comprising:
a lightning conductive circuit comprising at least one electrical conductor and at least one semiconductor located within the internal cavity at the blade root,
wherein the electrical conductor electrically couples the blade tip to a ground conductor, and wherein the electrical conductor electrically couples the semiconductor between one or more spar caps located on either or both of the pressure or suction sides and the ground conductor.

* * * * *